US007962729B2

(12) United States Patent
Rivera

(10) Patent No.: US 7,962,729 B2
(45) Date of Patent: Jun. 14, 2011

(54) DYNAMIC RUNTIME RANGE CHECKING OF DIFFERENT TYPES ON A REGISTER USING UPPER AND LOWER BOUND VALUE REGISTERS FOR THE REGISTER

(75) Inventor: Jose G. Rivera, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 12/348,712

(22) Filed: Jan. 5, 2009

(65) Prior Publication Data

US 2010/0174893 A1 Jul. 8, 2010

(51) Int. Cl.
*G06F 9/30* (2006.01)

(52) U.S. Cl. ......... 712/221; 708/498; 708/552; 712/244

(58) Field of Classification Search ........................ None
See application file for complete search history.

(56) References Cited

U.S. PATENT DOCUMENTS

| | | | | |
|---|---|---|---|---|
| 4,542,456 A * | 9/1985 | Hill | ............................... | 712/221 |
| 4,760,374 A * | 7/1988 | Moller | ........................ | 340/146.2 |
| 5,272,659 A * | 12/1993 | Starr | ............................ | 708/552 |
| 5,440,702 A * | 8/1995 | Brewer et al. | .................. | 712/223 |
| 7,277,438 B2 * | 10/2007 | Ambe et al. | ................... | 370/392 |

OTHER PUBLICATIONS

Lam, Lap-Chung et al., "Checking array bound violation using segmentation hardware", *International Conference on Dependable Systems and Networks* http://ieeexplore.ieee.org/xpl/freeabs_all.jsp?arnumber=1467813, (Obtained from the internet on Jan. 11, 2010) Jun. 28-Jul. 1, 2005, 388-397.

Sato, Mitsuhisa et al., "Run-time checking in Lisp by integrating memory addressing and range checking", ACM SIGARCH Computer Architecture News, vol. 17 , Issue 3 http://portal.acm.org/citation.cfm?id=74958&dl=GUIDE&coll=GUIDE&CFID=18908934&CFTOKEN=89315999 (Obtained from the internet on Jan. 26, 2009) Jun. 1989 , 290-297.

* cited by examiner

*Primary Examiner* — Kenneth S Kim
(74) *Attorney, Agent, or Firm* — DeLizio Gilliam, PLLC

(57) ABSTRACT

Software defects (e.g., array access out of bounds, stack overflow, infinite loops, and data corruption) occur due to integer values falling outside their expected range. Because programming languages do not include range-checking instructions as part of their language, to detect software defects and ensure that the code runs smoothly, programmers generally use 1) runtime assertions and/or 2) sub-range data types. However, these techniques cause additional conditional branches, incur additional overhead, and decrease processor performance. Processors comprising a range checking hardware feature supported by machine instructions for runtime integer range checking can eliminate the conditional branches generated during runtime integer range checks. Programming language extensions for the range checking hardware can allow dynamic range bounds to be defined during runtime without decreasing the processor's performance. This can allow for easier programming and code that is easier to maintain.

16 Claims, 4 Drawing Sheets

DYNAMIC RUNTIME RANGE CHECKING OF DIFFERENT TYPES ON A REGISTER USING UPPER AND LOWER BOUND VALUE REGISTERS FOR THE REGISTER

BACKGROUND

1. Technical Field

Embodiments of the inventive subject matter generally relate to the field of computers, and more particularly, to runtime checking of dynamic sub-ranges.

2. Background

Software can suffer from the effects of integer variables assuming values outside their specified range. This often leads to data corruption resulting from a variety of errors including stack overflow, array access out of bounds, etc. Programmers use programming practices, which include the use of assertions and sub range data types, to combat these errors. However, these programming practices often lead to an increase in conditional statements, which in turn decreases processor performance. To avoid the decrease in processor performance, programmers disable range checking in performance-critical code.

SUMMARY

Embodiments include a method comprising determining a target register. An instruction indicates operations to modify contents of the target register. A lower range bound value and an upper range bound value for the target register is determined. A set of one or more range bound registers indicate the upper range bound value and the lower range bound value. A value in the target register is determined to be invalid based on the lower range bound value and the upper range bound value. A range checking exception is generated, wherein the range checking exception indicates that the value in the target register violates any one of the lower and the upper range bound values.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
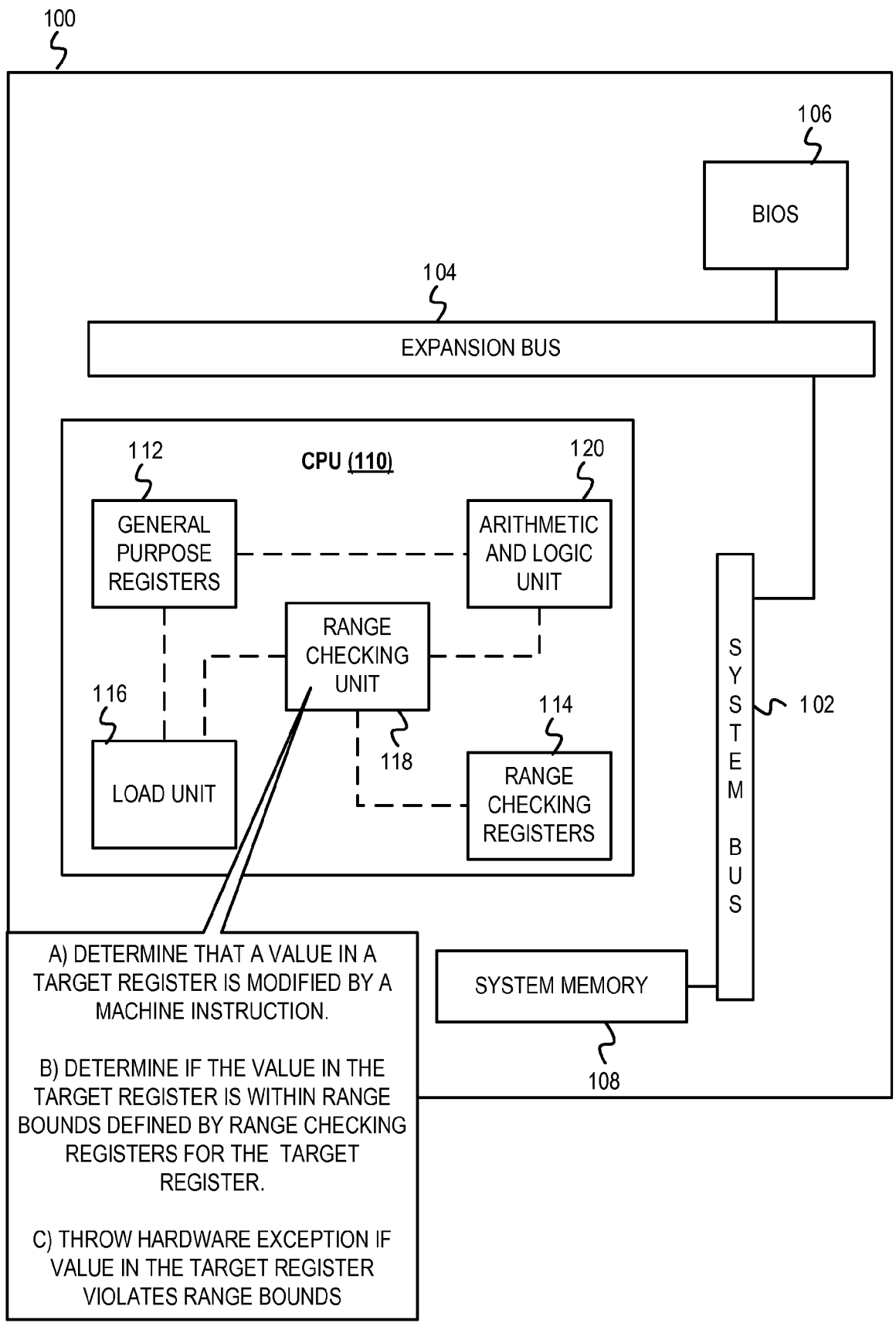
FIG. 1 is an example architectural diagram illustrating a computer system including hardware to enforce range checking.

The description that follows includes exemplary systems, methods, techniques, instruction sequences, and computer program products that embody techniques of the present inventive subject matter. However, it is understood that the described embodiments may be practiced without these specific details. Although examples refer to general purpose registers, techniques for range checking can be applied to any other types of registers, e.g., floating point registers, vector registers, etc. In some instances, well-known instruction instances, protocols, structures, and techniques have not been shown in detail in order not to obfuscate the description.

Software defects often occur due to integer values falling outside their expected range. Examples of such defects can include array access out of bounds, stack overflow, infinite loops, and data corruption. Programming languages do not include range-checking instructions as part of their language. Therefore, to detect software defects and ensure that the code runs smoothly, programmers generally use 1) runtime assertions (asserts) and/or 2) sub-range data types.

Software programmers using mainstream programming languages (e.g., C, C++, Java, etc.) typically insert runtime assertions (asserts) at strategic places in code to perform range checking on integer variables. An assert is a Boolean expression that is assumed to be true while the assert executes within a program. If the assert evaluated returns a "false" value, the program throws an exception. Asserts can be placed at function entry (pre-condition check), at function exit (post-condition check), inside loops (loop invariant check), and in all functions that manipulate the structure (data invariant checks). Although asserts are a quick and effective way of detecting program errors, runtime range checking using asserts leads to additional conditional branches which can slow down processor pipeline performance. Asserts can be tedious to use, hard to maintain, incur additional overhead, and cause a decrease in performance. Introducing detailed range checking asserts also makes code maintenance harder because programmers have to remember to update all the asserts affected by their code changes. Therefore, programmers typically enable asserts for runtime range checking during development and remove (or disable) these asserts from production code, especially in performance-critical code.

Some programming languages (e.g., Ada, Pascal, etc.) alleviate the problems associated with using asserts by providing sub-range data types. Sub-range data types define a subset of values of a particular standard data type and can be used to detect when a variable's value falls outside a given boundary. By declaring an integer variable of a sub-range type, the programmer need not use asserts to check the range of the variable at runtime, since the compiler generates code for variable range checking. However, bounds on the sub-range data types are generally constants and are known at compile-time. Also, in using sub-range data types, the compiler generates runtime checking code and performs range checking every time the variable is modified (or type casted). Thus, depending on the number of variable modifications, the additional runtime range checking code generated may include more conditional branches as compared to using asserts. As a result, programmers may also choose to disable runtime range checking code generation in performance-critical production code. Thus, asserts and sub-range data types generate conditional branches for runtime range checking which impacts processor performance.

Processors comprising a range checking hardware feature supported by machine instructions for runtime integer range checking can help eliminate the conditional branches generated for runtime integer range checks. This can also enable runtime checking of integer ranges to be included in production code, without decreasing the processor's performance (e.g., processor pipeline throughput). Programming language extensions (i.e., support for higher level languages like C programming language), which allow dynamic range bounds to be defined during runtime, operating on the range checking hardware can allow for easier programming. This allows commonly used programming asserts to be replaced by declarative range constraints. These declarative range constraints would need to be placed only where integer variables (including fields of structures) are declared, and hence would be easier to maintain.

FIG. 1 is an example architectural diagram illustrating a computer system including hardware to enforce range checking. The computer system 100 comprises an expansion bus 104, a system bus 102, system memory 108, a basic input output system (BIOS) unit 106, and a central processing unit (CPU) 110. As shown, the CPU 110 is coupled with the system memory 108 via a system bus 102. In some embodiments, the system memory 108 can include one or more of random access memory (RAM) (e.g., static RAM, dynamic RAM, synchronous dynamic RAM, extended data output RAM, etc.), read only memory (ROM) (e.g., Programmable ROM, etc.), or other types of media suitable for storing electronic instructions and data. The expansion bus 104 couples the BIOS 106 with the system bus 102. In some embodiments, the expansion bus 104 can include a peripheral component interconnect (PCI) bus, PCI-Express (PCIW) bus, PC Card bus, CardBus, industry standard architecture (ISA) bus, InfiniBus, etc.

The central processing unit (CPU or processor) 110 comprises general purpose registers 112 coupled with a load unit 116. The CPU 110 also comprises a range checking unit 118 coupled with the load unit 116, an arithmetic and logic unit (ALU) 120, and range checking registers 114. The general purpose registers 112 are coupled with the arithmetic and logic unit 120. The load unit 116 carries out load instructions to load data into one or more of the general purpose registers 112 from a memory location in accordance with a decoded instruction. Data can be loaded from a memory location, another register, an immediate value, etc. Embodiments can also implement a single unit to carry out store instructions as well as load instructions ("load/store unit"). The load/store unit can store data (a value in the one or more general purpose registers 112, an immediate value, etc) into a memory location specified by a store instruction. The ALU 120 performs one or more arithmetic and/or logic operations on the data and generates an output.

At stage A, a range checking unit 118 determines that a value in one of the general purpose registers 112 targeted by an instruction ("target register") is modified by a machine instruction. In some instances, the target register may be initialized to "zero" (or another pre-defined initialization value). Writing to an unused target register or a target register that has been initialized may also be considered as modifying the register value. Determining that a value in a general purpose register 112 is modified by a machine instruction comprises retrieving an output of ALU 120 and determining a target general purpose register 112 for the output of ALU 120 (e.g., by interfacing with an instruction decoder). Determining that a value in a general purpose register 112 is modified by a machine instruction can also comprise retrieving an output of the load unit 116 and determining a target general purpose register 112 for the output of the load unit 116.

At stage B, the range checking unit 118 determines if the value in the general purpose register 112 is within range bounds defined by range checking registers 114 for the general purpose register 112. The range checking unit 118 accesses the range checking registers 114, determines lower and upper bounds for the target register, and determines the type of range checking to be performed on the ALU's output. The range checking unit 118 determines whether the value to be stored in the target register of the general purpose registers 112 is within a specified range (as indicated by the range checking registers 114).

At stage C, the range checking unit 118 throws a hardware exception if the value in the target register violates the range bounds. For example, the range checking unit 118 determines that the ALU output to be stored in the target register is not within the target register's specified range and throws a hardware exception. The range checking unit 118 may also direct the load unit 116 not to store the ALU output in the target register. Programmers can use special machine instructions, which operate on the range checking registers 114, to specify the range bounds for one or more general purpose registers 112. After the processor 110 executes the special machine instruction, it enables range checking for the one or more general purpose registers 112. Machine instructions can also allow the programmer to disable range checking for one or more general purpose registers 112 and to save or restore the range checking state associated with the general purpose registers (e.g., during context switches).

Figure 2:
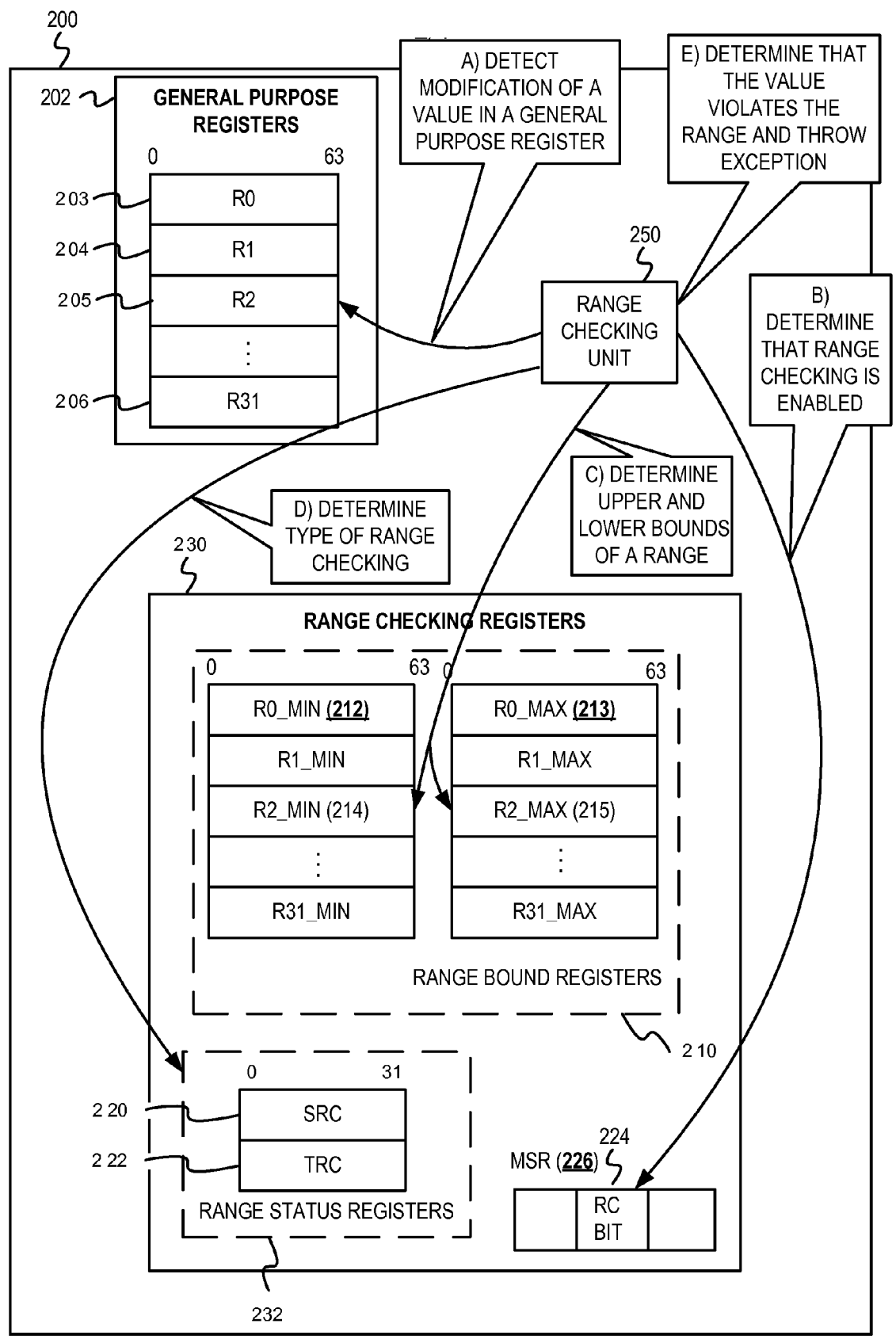
FIG. 2 is an example conceptual diagram depicting range checking in a processor.

The hardware structure of the range checking registers 114 is further described using FIG. 2. FIG. 2 is an example conceptual diagram depicting range checking in a processor. An example processor 200 comprises thirty-two general purpose registers 202, range checking registers 230 associated with the general purpose registers 202, and a range checking unit 250. The thirty-two 64-bit general purpose registers 202 are R0 (203), R1 (204), R2 (205) . . . , R31 (206). The range checking registers 230 comprise range bound registers 210, range status registers 232, and a range checking (RC) bit 224 in the processor's machine status register (MSR) 226.

At stage A, the range checking unit 250 detects modification of a value in a general purpose register R2 205. For example, the range checking unit 250 determines that a result of an arithmetic operation has been stored in the general purpose register R2 205.

At stage B, the range checking unit 250 determines that range checking is enabled by examining the RC bit 224. The RC bit 224 is a flag in the processor's machine status register (MSR) 226 that indicates whether range checking is enabled (RC=1) or disabled (RC=0) for all the thirty two general purpose registers 202.

At stage C, the range checking unit 118 determines upper and lower bounds of a range. The range bound registers 210 comprise registers that correspond to the general purpose register R2 205. The upper bound is stored in range bound register R2_MIN 214. The lower bound is stored in range bound register R2_MAX 215. As shown in FIG. 2, for each of the 32 general purpose registers 202 (Rk=R0, R1, R2 . . . , R31), there is a pair of 64-bit range bound registers (Rk_min and Rk_max) 210 which hold the range bounds associated with register Rk. For example, R0_min 212 and R0_max 213 respectively hold the lower and upper bound values for register R0 203.

At stage D, the range checking unit 250 determines a type of range checking based on the range status registers 232. The range status registers 232 comprise two 32-bit registers SRC 220 and TRC 222. The SRC register 220 indicates the "signedness" of the range bound registers 210 associated with each general purpose register 202. If a $k^{th}$ bit of the SRC register 220 is 1, the processor uses signed arithmetic to perform range checking on register Rk 202. If the $k^{th}$ bit of the SRC register 220 is 0, the processor uses unsigned arithmetic to perform range checking on register Rk 202.

The TRC register 222 indicates the type of range checking to be performed on each register. If the $k^{th}$ bit of the TRC register 222 is 0, the processor 110 performs inclusive range checking on register Rk 202. Inclusive range checking implies that the value of register Rk 202 must be inside the range specified by the corresponding range bound registers 210 (i.e., Rk_min≦Rk≦Rk_max). Alternately, if the k$^{th}$ bit of TRC register 222 is 1, the processor 110 performs exclusive range checking on register Rk 202. Exclusive range checking implies that the value of register Rk 202 must lie outside the bounds specified by the corresponding range bound registers 210 (i.e., Rk<Rk_min or Rk>Rk_max).

At stage E, the range checking unit 250 determines that the value written to the general purpose register R2 (205) violates the range and throws an exception. The value is out of range if it violates either of the upper or lower bound. In another embodiment, the range checking unit 250 can determine whether the value to be written into the general purpose register (e.g., output of an ALU, output of a load/store unit, etc.) violates the range bounds. The range checking unit 250 can throw an exception if the value violates either of the lower or upper range bounds and direct the ALU (or the load/store unit) to discard the illegal value. In some implementations, the range checking unit 250 may temporarily store the illegal value (e.g., in another register, in a memory location, etc.) to enable further debugging.

The initial states of the range checking registers 230, range status registers 232 and RC bit 224, when the processor 110 is first powered-on, can be as follows; 1) the RC bit 224 in the MSR 226 is set to zero, 2) all the lower bound registers (Rk_min) are set to zero, 3) all the upper bound registers (Rk_max) are set to their maximum value, and 4) the range status registers 232 (i.e., SRC and TRC) are set to zero. Thus, by default, range checking is disabled for all the general purpose registers 202 and unsigned inclusive range checking is selected for all the general purpose registers.

The range checking resisters are hidden from the programmer. This implies that programmers cannot manipulate the range checking registers other than by using a special instruction set. Once the general purpose register's range is set (using the special instruction set), instructions that attempts to modify the general purpose registers will trigger a register range check. If a value written or to be written in a general purpose register violates the range bounds, the range checking unit 250 triggers a hardware exception. Also, the range checking registers 230 and the logic of the range checking unit 250 eliminates the need for processor compare and branch instructions. Thus, when the range checking unit detects an operation that will write a value to a target register, the logic of the range checking unit performs range checking based on values in the range checking registers if range checking is enabled by a flag bit 224. This hardware-based range checking can be more efficient in terms of instruction cycles.

In some embodiments, the processor (e.g., processor 110 of FIG. 1) can have load/store architecture, such that all updates to variables in a program have to follow the sequence load into register from memory, modify register, store register value to memory. Therefore, performing range checking at the register level is sufficient to implement range checking on memory variables as well. In other embodiments, the range checking registers (e.g., range checking registers 232 of FIG. 2) can also be used to detect stack overflow and underflow. For example, a runtime stack pointer can be stored in a general purpose register designated for that purpose (e.g., register R1 is the stack pointer in systems with an IBM-AIX operating system with PowerPC® architecture). When the operating system initializes the stack pointer register for a given thread (on a context switch), it can also specify the range bounds for the register (i.e., stack pointer range bounds). Thus, if the stack pointer register (R1) takes a value that is outside the range of addresses in the allocated stack, the range checking unit 250 will throw an exception.

Any one of these functionalities may be partially (or entirely) implemented in hardware, firmware, and/or machine-readable media including instructions for performing the operations described herein. For example, the functionality may be implemented with an application specific integrated circuit, in logic implemented in the processing unit, in a co-processor on a peripheral device or card, etc. Further, realizations may include fewer or additional components not illustrated in FIGS. 1 and 2 (e.g., video cards, audio cards, network interfaces, peripheral devices, etc.). For example, in some instances, the computer system 100 may include multiple processors, multiple cores, multiple external CPU's. Also, not shown in FIG. 1, the expansion bus 104 can be connected to peripheral devices including ports, I/O controllers, busses, audio & video devices, etc. In some instances, components may be integrated or subdivided. In addition, embodiments may be embodied in an electrical, optical, acoustical or other form of propagated signal (e.g., carrier waves, infrared signals, digital signals, etc.), or wireline, wireless, or other communications medium.

Figure 3:
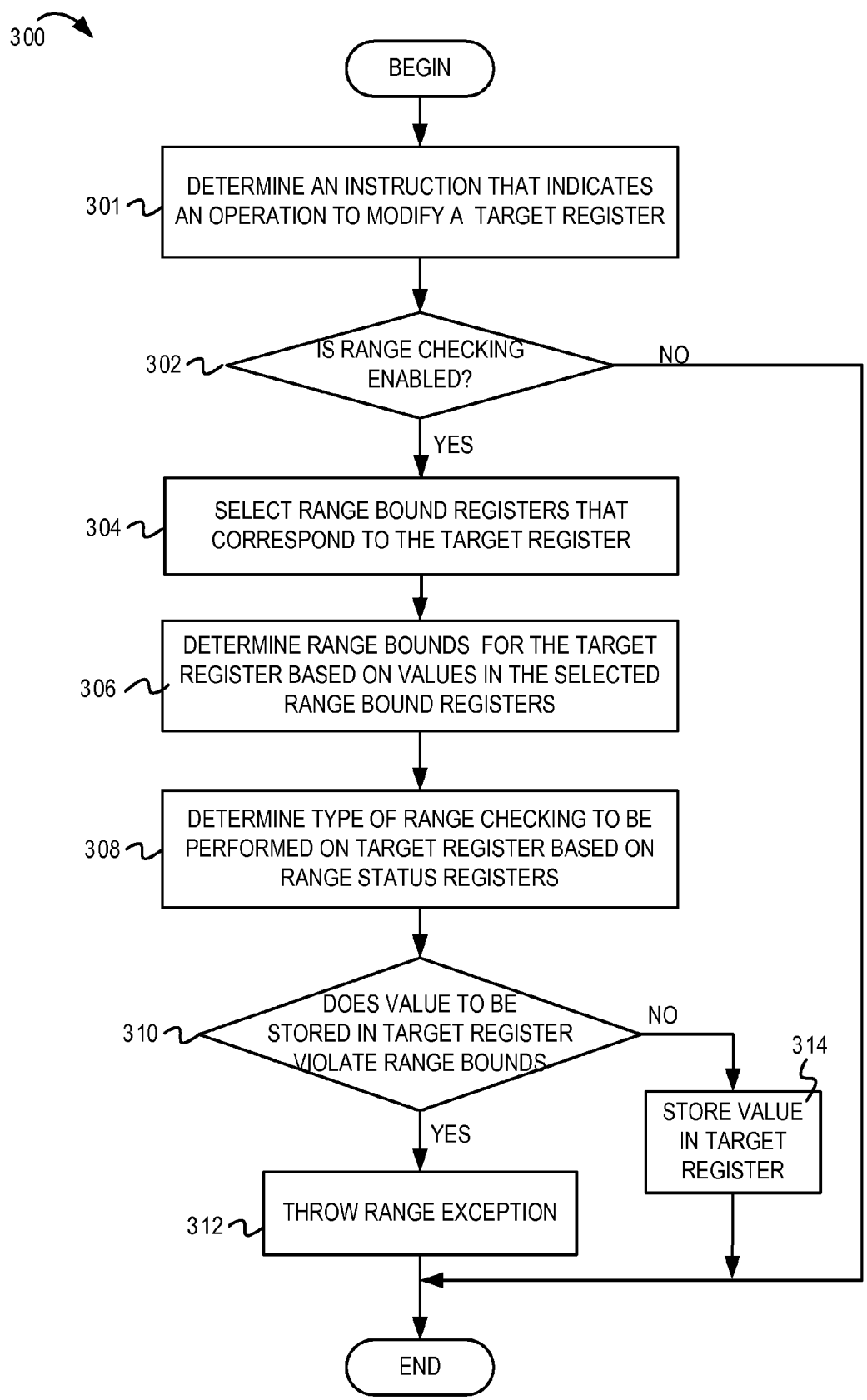
FIG. 3 is a flow diagram illustrating example operations for enforcing register range checking.

FIG. 3 is a flow diagram illustrating example operations for dynamic register range checking. The flow diagram 300 begins at block 301.

At block 301, a range checking unit determines that a processor is executing an instruction that indicates an operation to modify a target register. In some implementations, an instruction decoder may interface with the range checking unit and indicate that a register is being modified. In other implementations, the range checking unit can monitor output from or input into one or more units (e.g., an arithmetic logic unit, a load unit, etc.) and determine whether a register is being modified. The flow continues at block 302.

At block 302, the range checking unit determines if range checking is enabled. Range checking may be enabled by a special instruction in the instruction set. The range checking unit can determine that range checking is enabled by examining a range checking (RC) bit in the processor's machine status register. If the RC bit (e.g., RC bit 224 of FIG. 2) is set (RC=1), implying that range checking is enabled for all the registers, the flow continues at block 304. Otherwise, the flow ends without the range checking unit performing any range checking operations.

At block 304, the range checking unit selects range bound registers that correspond to the target register. In some implementations, a single range bound register may be associated with the target register. In load/store processor architectures, data is first loaded into a target register, where it is modified, and then stored in memory. This enables the range checking unit to use the range checking registers to determine whether the data held in the target register is a valid value, before storing the data in memory. In some embodiments, the range checking unit may examine the data before storing it in the general purpose register (e.g., at the output of the ALU, at the output of the load unit, etc). The flow continues at block 306.

At block 306, the range checking unit determines range bounds for the target register based on the values in the selected range bound registers. Each register has two hidden range bound registers associated with it—one to hold the lower bound on the register's value and the other to hold the upper bound on the register's value. In some implementations, the target register may have a single hidden extended range bound register associated with it. The extended range bound register may hold both the lower bound and the upper bound on the target register's value. For example, a single 64-bit range bound register may be used instead of two 32-bit range bound registers. The 32 least significant bits of the 64-bit range bound register may hold the lower bound while the 32 most significant bits may hold the upper bound on the target register's value. After the range checking unit determines the upper and lower range bounds for the target register, the flow continues at block 308.

At block 308, the range checking unit determines the type of range checking to be performed on the target register based on values in the range status registers. The range checking registers include two 32-bit status registers, SRC and TRC. Assuming that the k$^{th}$ register is modified by the instruction, the range checking unit accesses the k$^{th}$ bit in the SRC register to determine whether signed or unsigned arithmetic is to be used for range checking. Likewise, the range checking unit accesses the k$^{th}$ bit in the TRC register to determine whether inclusive (register values within the range bounds) or exclusive (register values outside the range bounds) range checking should be performed. The flow continues at block 310.

At block 310, the range checking unit determines whether the value to be stored in the target register violates the range bounds based on the type of range checking being performed. When the range checking unit encounters an operation that attempts to modify the value of the target register, the range checking unit checks for a violation of the register's range bounds. In some implementations, after an arithmetic and logic unit (ALU) performs its computations and determines an output value to be stored in the target register, the range checking unit may determine whether the ALU output value falls within the register's range bounds. In another implementation, a load unit may trigger the range checking unit every time it (the load unit) tries to load a value into the target register. The range checking unit may then determine whether the value to be loaded into the target register is valid. In another implementation, the load unit may interface with the range checking unit, before storing a value in the target register, to determine if the value to be loaded into the target register is a valid value. In some implementations, the range checking unit may be triggered after the value is stored in the target register. If the range checking unit determines that the value to be stored in the determined target register violates the range bounds, the flow continues at block 312. Otherwise, the flow continues at block 314.

At block 312, the range checking unit throws a hardware range exception to indicate an illegal register value. The range checking unit may also direct a load unit to not store the illegal value in the target register. In some instances, the operating system (OS) can generate a new signal to indicate a range exception (SIGRANGE). The application's signal handler can take the necessary steps to catch the signal and handle the error (e.g., restart the application, modify the register value, etc). If the application does not have a signal handler, the application may terminate. If the range violation occurs in the kernel code, the kernel can catch the hardware exception or can cause the program to crash initiating a core dump. In some implementations, to enable better debugging, the range checking unit may store the illegal register value in a temporary memory location or may retain the illegal register value in the target register. After the range checking unit throws a hardware range exception, the flow ends.

At block 314, the range checking unit directs the load unit to store the valid value in the target register. In load store processor architectures, the valid register value can also be stored in a suitable memory location. Performing range checking at the register level ensures that valid values within the specified range are stored into memory as well. From block 314, the flow ends.

A RANGE machine instruction that sets the current range checking parameters for a given general purpose register can be added to an instruction set. In other words, this instruction sets range bound registers (Rk_min, Rk_max) associated with a register Rk, according to the specified range. Also, depending on the specified operands, the instruction turns on or off the k$^{th}$ bit in the SRC 220 and TRC 222 registers. Once range checking is enabled for a register, and if the RC bit 224 of the MSR register 226 is on (RC=1), any subsequent instruction that modifies the general purpose register will trigger a range checking operation. Range checking remains in effect for the specified general purpose register until the processor executes another RANGE instruction or a range-clear (RNGCLEAR) instruction for the specified general purpose register.

The syntax for the RANGE instruction is:

RANGE <signedness bit>, <range type bit>, <Rdest>, <Rlow>, <Rhigh> where,

<signedness bit> specifies if signed (1) or unsigned (0) arithmetic will be used. This operand is used to set the corresponding bit in the SRC register (according to the register specified for <Rdest>)

<range type bit> specifies if the range is inclusive (0) or exclusive (1). This operand is used to set the corresponding bit in the TRC register (according to the register specified for <Rdest>)

<Rdest> indicates the target register, Rk, for which range bounds are being set.

<Rlow> indicates the register that contains the lower bound of the range. This operand is used to set the corresponding Rk_min register.

<Rhigh> indicates the register that contains the upper bound of the range. This operand is used to set the corresponding Rk_max register.

For example, the machine code to set range checking for general purpose register R1, so that R1 is within the range 0 to 65535, using unsigned arithmetic and inclusive range checking is,

| | |
|---|---|
| LI R5, 0 | (Value in R5 = 0) |
| LI R6, 0xffff | (Value in R5 = 65535) |
| RANGE 0, 0, R1, R5, R6 | (Setting range checking for R1 with specified conditions) |

As another example, the machine code to set range checking for general purpose register R3, so that R3 never takes values in the range −1 to 1, using signed arithmetic and exclusive range checking is,

| | |
|---|---|
| LI R3, −1 | (Value in R3 = −1) |
| LI R4, 1 | (Value in R4 = 1) |
| RANGE 1, 1, R3, R3, R4 | (Setting range checking for R3 with specified conditions) |

In addition to the RANGE machine instruction there are three other machine instructions that operate on the hidden range bound registers—RNGCLEAR, RNGSAVE, and RNGRESTORE. The following discussion will describe each of these instructions in greater detail.

The RNGCLEAR instruction clears the current range checking parameters for a specified general purpose register 202. In other words, using the RNGCLEAR instruction resets the range bound registers 210 (Rk_min, Rk_max) associated with the specified general purpose register (i.e., Rk), to (0x0000000000000000, 0xffffffffffffffff). This instruction also turns off the $k^{th}$ bit in the SRC and TRC registers (i.e., $k^{th}$ bit=0).

The syntax for this instruction is:
RNGCLEAR <Rk>
where <Rk> indicates the target register, Rk, for which range checking is being disabled. For example, the instruction to disable range checking for general purpose register R3 is, RNGCLEAR R3.

The RNGSAVE instruction saves the range checking state for all general purpose registers, in memory, at a specified address. In other words, this instruction stores, in memory, the values in the range bound registers (Rk_min, Rk_max) for all registers Rk (k: 0 . . . 31) and the values in the range status registers (i.e., SRC and TRC).

The syntax for this instruction is RNGSAVE <reg>,
where; <reg> is a general purpose register that contains the memory address where the range checking registers are to be saved.

For example, the instruction to save the contents of the hidden range checking registers at memory location specified by general purpose register R3 is, RNGSAVE R3.

The layout in memory of the saved range-checking registers is described by the following C structure, where values of the range bound registers and range status registers, for each of the thirty two general purpose registers, are stored contiguously.

```
struct range_checking_regs
{
uint64_t rc_r0_min;
uint64_t rc_r0_max;
...
uint64_t rc_r31_min;
uint64_t rc_r31_max;
uint32_t rc_src;
uint32_t rc_trc;
};
```

The RNGRESTORE instruction restores the range-checking state for all general purpose registers, which was previously saved in memory, using the RNGSAVE instruction. In other words, this instruction restores, from memory, the values in the range bound registers and the range status registers from the address specified in a register operand.

The syntax for this instruction is RNGRESTORE <reg>,
where; <reg> is a general purpose register that contains the memory address where the range checking registers are to be restored from.

For example, the instruction to restore the contents of the hidden range checking registers from the memory location specified by general purpose register R3 is, RNGRESTORE R3.

In some embodiments, the processor's calling conventions may dictate that range settings may not be preserved across function calls. In some instances, compilers can automatically generate code to save range settings before function calls and restore the range settings after control is passed back to the calling function. In a multi-processor environment, a context switching routine (e.g., switching between threads) can use the RNGSAVE and RNGRESTORE instructions to save and restore range checking states (i.e., range bounds and range status values) as part of the thread's context. In some embodiments, interrupt handlers may also be modified to disable range checking on entry (e.g., by turning off the RC bit in the MSR) to prevent infinite recursion while handling range checking exceptions.

Software language extensions can be used to exploit the hardware-based range checking features from software written in high-level languages. The software language extensions (e.g., pragmas) can provide a mechanism to specify the range bounds associated with an integer variable, an integer typedef, or an integer field of a structure. For example, in C/C++, ranges can be specified using one of the pragmas in front of the corresponding variable typedef or field declaration. The range bounds can be constants (e.g., similar to sub-range data types) or variables in the scope of the variable being declared (e.g., range bounds on one variable can depend on one or more other variables). When a compiler encounters a range checking pragma, it generates the corresponding machine level instructions based on the pragma. The machine level instructions enable range checking, load minimum and maximum bounds into range bound registers and set status bits corresponding to "signedness" and type of range checking (i.e., inclusive or exclusive). Pragmas assist programmers in enabling and applying range checking without using asserts, as the compiler generates code to use the range checking hardware based on the programmer-specified pragmas. Also, instead of generating explicit compare and branch instructions to implement runtime range checking, the compiler can generate range checking machine instructions (e.g., RANGE, RNGSAVE, etc.) to specify the ranges of the registers allocated to hold values of the variables, store and restore range bounds, etc.

Figure 4:
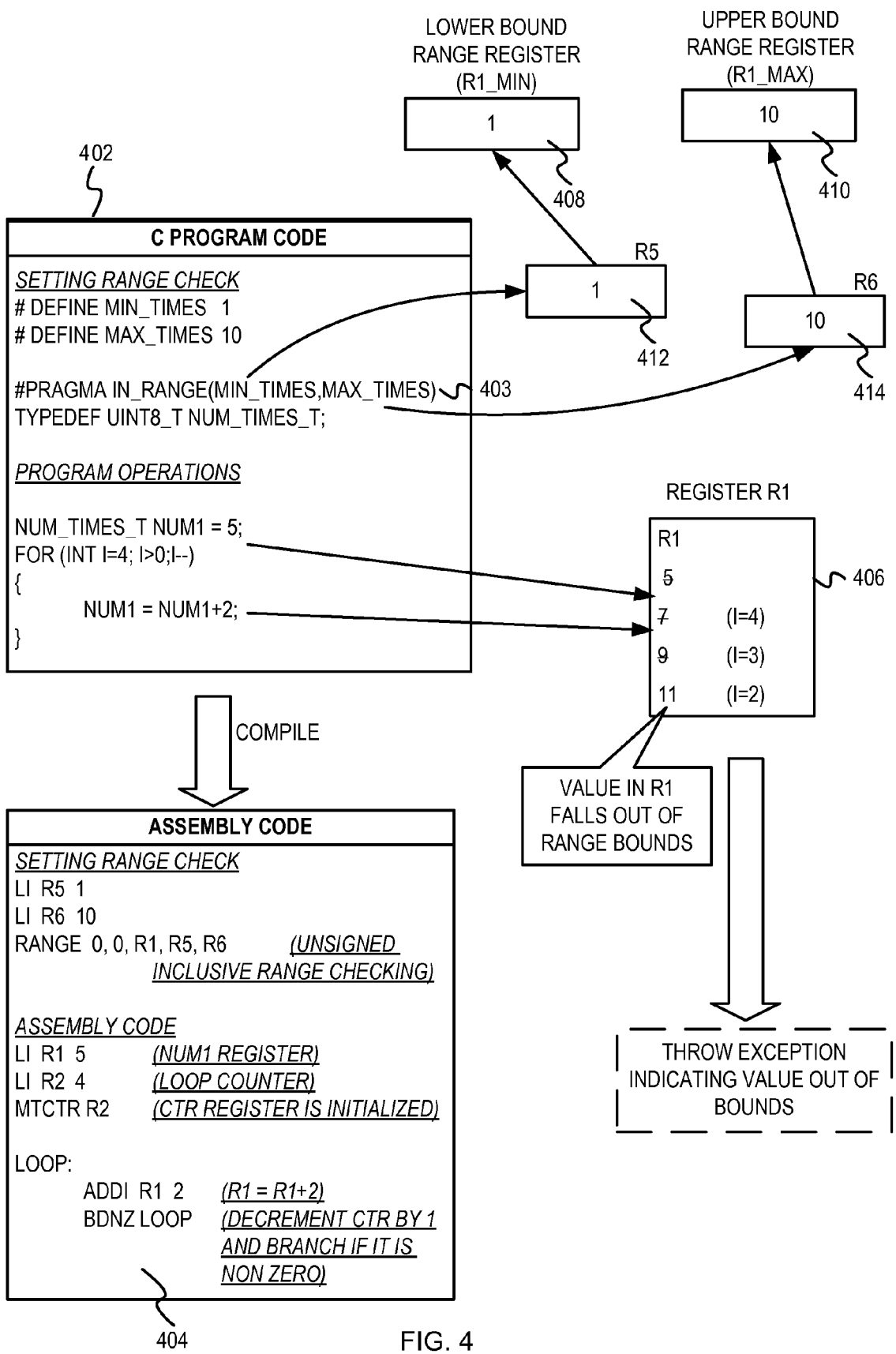
FIG. 4 is an example conceptual diagram illustrating relationships between high level software extensions, processor assembly instructions, and the processor's hidden range checking registers.

FIG. 4 is an example conceptual diagram illustrating relationships between high level software extensions, processor assembly instructions, and the processor's hidden range checking registers. A C program code snippet 402 illustrates the use of a pragma 403 (i.e., in_range pragma) to set inclusive unsigned range checking for an integer typedef (i.e., NUM_TIMES_T). FIG. 4 also illustrates PowerPC assembly code 404 that is created when C program code 402 is compiled. The Power PC assembly code 404 expresses the modifications in register values 406. Although the Power PC assembly code 404 is executed by a processor rather than the C code 402, discussion will focus on hardware interaction in relation to the C code 402.

The "in_range" pragma 403 specifies an unsigned inclusive range. The syntax for the pragma 403 is:

pragma in_range(<lower bound>, <upper bound>)
<variable or typedef declaration> where,
<lower bound>, <upper bound> can be signed integer expressions, using constants or variables in scope where the pragma is used.

In C code 402, the programmer defines a lower bound (min_times) and upper bound (max_times) on a variable's values. The "in_range" pragma 403 defines the lower and upper bound values of all variables declared with the data type "NUM_TIMES_T". Variable of type "NUM_TIMES_T" will be checked to ensure that values of the variables fall within the specified lower and upper bounds. The compiler determines that a variable "NUM1" of type "NUM_TIMES_T" in C code 402 is to be stored in general purpose register R1. Since the type "NUM_TIMES_T" is associated with the pragma 403, the compiler translates the pragma 403 instruction into the corresponding RANGE machine instruction in Power PC assembly code 404 thus enforcing range checking on register R1. As shown in Power PC assembly code 404, the compiler generates a range definition instruction, which indicates that the value of register R1 406 (i.e., variable "NUM1") should be between 1 and 10 and that inclusive unsigned range checking should be performed on register R1 406. The processor stores the range bounds (1 and 10) from registers R5 (412) and R6 (414) respectively in the appropriate lower bound range register 408 and upper bound range register 410.

A loop is defined in the C code 402. The loop is to be executed four times. Each time the loop is executed variable "NUM1" is incremented by 2. The corresponding Power PC assembly code 404 includes instructions to load the value of variable "NUM1" into register R1 406 and initialize the loop counter (CTR). In the loop, an arithmetic and logic unit in the processor adds two to the previous value of R1 at each loop iteration (i.e., R1=R1+2), decrements the value in CTR (i.e., CTR=CTR−1) and returns to the beginning of the loop until the value in CTR reaches zero. The range checking unit (e.g., the range checking unit 118 of FIG. 1) performs a range check every time the value of the variable "NUM1", and hence the value of register R1 406, is modified (i.e., when "NUM1" is initialized with value 5 and every time "NUM1" is modified in the loop). The values stored in the register R1 406 are shown at different times during the program's execution. The value in register R1 406 at the beginning of the loop is 5. As the control passes into the loop, the processor modifies the value of R1 406. Because R1=7 (I=4) and R1=9 (I=3) fall within the range bounds (1≦R1≦10), the program continues to execute the code without any errors. When I=2, the value of R1 406 is 11. This value of R1 406 falls outside the range bounds (1≦R1≦10). Therefore, the range checking unit throws an exception indicating that the register value is out of bounds. As explained earlier, in some instances, the program may include code to catch and handle this exception, while in other instances, the program may terminate after the exception is thrown.

The compiler may generate and execute the RANGE instruction for a target register only once irrespective of the number of operations performed on the target register. In instances where the program has more than one variable to be range checked, the compiler can generate a set of RANGE instructions at the beginning of the assembly code that map each of the variables to various general purpose registers, set the range bound registers, configure the range status registers, and enable range checking.

In addition to the "in_range" pragma for specifying an unsigned exclusive range, the C language extensions also include three other pragmas including an "in_signed_range" pragma for specifying a signed inclusive range, an "out_range" pragma for specifying an unsigned exclusive range, and an "out_signed_range" pragma for specifying a signed exclusive range. The following discussion will describe each of these pragmas along with their syntax and an example of the pragma's usage.

The "in_signed_range" pragma specifies a signed inclusive range. The syntax for this pragma is:

```
#pragma in_signed_range(<lower bound>, <upper bound>)
    <variable or typedef declaration>
``` where,
<lower bound>, <upper bound> can be signed integer expressions, using constants or variables in scope where the pragma is used.

For example, C program code to specify that all variables with the typedef "delta_t" must lie within the range −1 to 1 and that inclusive range checking should be performed using signed arithmetic is,

```
#define MIN_DELTA −1
#define MAX_DELTA 1
#pragma in_signed_range(MIN_DELTA, MAX_DELTA)
typedef int8_t delta_t;    /* valid values are within the range −1 ... 1 */
```

The "out_range" pragma specifies an unsigned exclusive range. The syntax for this pragma is:

```
#pragma out_range(<lower bound>, <upper bound>)
    <variable or typedef declaration>
``` where,
<lower bound>, <upper bound> can be unsigned integer expressions, using constants or variables in scope where the pragma is used.

For example, the C code to specify that all variables with the typedef "num_times_t" must lie outside the range 0 to 4095 and that range checking should be performed using unsigned arithmetic is,

```
#define MAX_FORBIDDEN_ADDR 4095
#pragma out_range(0, MAX_FORBIDDEN_ADDR)
typedef uint8_t num_times_t;   /* valid values are outside
                                  the range 0 ... 4095 */
```

The "out_signed_range" pragma specifies a signed exclusive range. The syntax for this pragma is

```
#pragma out_signed_range(<lower bound>, <upper bound>)
    <variable or typedef declaration>
``` where,
<lower bound>, <upper bound> can be signed integer expressions, using constants or variables in scope where the pragma is used.

For example, the C code to specify that all variables with the typedef "delta_t" must lie outside the range −5 to 5 and that range checking should be performed using signed arithmetic is,

```
#define MIN_DELTA −5
#define MAX_DELTA 5
#pragma out_signed_range(MIN_DELTA, MAX_DELTA)
typedef int8_t delta_t;   /* valid values are outside the range −5 ... 5 */
```

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for runtime checking of dynamic sub-ranges of integers are described herein and may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a target register based, at least in part, on an instruction that indicates operations to modify contents of the target register;
   determining a type of range checking indicated for the target register by range status registers, wherein the range status registers indicate any one or more of whether range checking is performed using signed or unsigned arithmetic and whether inclusive or exclusive range bounds are applied on the target register;
   determining a lower range bound value and an upper range bound value for the target register, wherein a set of one or more range bound registers indicate the upper range bound value and the lower range bound value;
   determining, based on the lower range bound value and the upper range bound value, that a value to be stored in the target register is invalid; and
   generating a range checking exception that indicates that the value to be stored in the target register violates any one of the lower and the upper range bound values.

2. The method of claim 1, wherein each bit of the range status registers corresponds to one of a plurality of registers.

3. The method of claim 1, wherein the set of one or more range bound registers that indicate the upper range bound value and the lower range bound value comprises any one of an extended range bound register indicating the lower and the upper range bound value, and a pair of distinct registers, one of which indicates the lower range bound value and the other of which indicates the upper range bound value.

4. The method of claim 1, wherein setting a range checking flag in a machine status register (MSR) globally enables range checking for a plurality of registers.

5. The method of claim 1, wherein the set of one or more range bound registers are modified using any one of special machine instructions for assigning, saving, restoring, and clearing the lower and upper range bound values for the target register.

6. The method of claim 1, further comprising:
   determining, based on the lower range bound value and the upper range bound value, that a value in the target register is invalid; and
   generating a range checking exception that indicates that the value stored in the target register violates at least one of the lower and the upper range bound values.

7. The method of claim 6, wherein the generating the range checking exception further comprises removing the invalid value from the target register.

8. One or more machine-readable media having stored therein a program product, which when executed a set of one or more processor units causes the set of one or more processor units to perform operations that comprise:
   determining a target register based, at least in part, on an instruction that indicates operations to modify contents of the target register;
   determining a type of range checking indicated for the target register by range status registers, wherein the range status registers indicate any one or more of whether range checking is performed using signed or unsigned arithmetic and whether inclusive or exclusive range bounds are applied on the target register;
   determining a lower range bound value and an upper range bound value for the target register, wherein a set of one or more range bound registers indicates the upper range bound value and the lower range bound value;
   determining, based on the lower range bound and the upper range bound values, that a value to be stored in the target register is invalid; and
   generating a range checking exception that indicates that the value to be stored in the target register violates any one of the lower and the upper range bound values.

9. The machine-readable media of claim 8, wherein each bit of the range status registers corresponds to one of a plurality of registers.

10. The machine-readable media of claim 8, wherein the set of one or more range bound registers that indicate the upper range bound value and the lower range bound value comprises any one of an extended range bound register indicating the lower and the upper range bound value a pair of distinct registers, one of which indicates the lower range bound value and the other of which indicates the upper range bound value.

11. The machine-readable media of claim 8, wherein setting a range checking flag in a machine status register globally enables range checking for a plurality of registers.

12. The machine-readable media of claim 8, wherein the set of one or more range bound registers are modified using any one of special machine instructions for assigning, saving, restoring, and clearing the lower and upper range bound values for the target register.

13. The machine-readable media of claim 8, wherein the operations further comprise:
  determining, based on the lower range bound value and the upper range bound value, that a value in the target register is invalid; and
  generating a range checking exception that indicates that the value stored in the target register violates at least one of the lower and the upper range bound values.

14. The machine-readable media of claim 13, wherein said operation of generating the range checking exception further comprises removing the invalid value from the target register.

15. An apparatus comprising:
  one or more registers;
  one or more range checking registers comprising a set of one or more range bound registers indicating an upper and a lower range bound value for the registers;
  an arithmetic and logic unit operable to perform arithmetic and logic operations on one or more of the registers;
  range status registers; and
  a range checking unit operable to,
    determine a target register based, at least in part, on an instruction indicates operations to modify contents of the target register;
    determine a type of range checking indicated for the target register by the range status registers, wherein the range status registers indicate any one or more of whether range checking is performed using signed or unsigned arithmetic and whether inclusive or exclusive range bounds are applied on the target register;
    determine a lower range bound value and an upper range bound value for the target register, wherein the set of one or more range bound registers indicate the upper range bound value and the lower range bound value;
    determine, based on the lower range bound and the upper range bound values, that a value to be stored in the target register is invalid; and
    generate a range checking exception that indicates that the value to be stored in the target register violates any one of the lower and the upper range bound values.

16. The apparatus of claim 15, wherein the range checking unit comprises one or more machine-readable media.

* * * * *